United States Patent
Hwang

(10) Patent No.: US 9,787,869 B1
(45) Date of Patent: Oct. 10, 2017

(54) PRINT JOB ACCESS PROVISION

(71) Applicant: HEWLETT-PACKARD DEVELOPMENT COMPANY, L.P., Houston, TX (US)

(72) Inventor: Peter G. Hwang, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/091,262

(22) Filed: Apr. 5, 2016

(51) Int. Cl.
G06F 3/12 (2006.01)
H04N 1/32 (2006.01)

(52) U.S. Cl.
CPC ....... *H04N 1/32539* (2013.01); *G06F 3/1204* (2013.01); *G06F 3/1232* (2013.01); *G06F 3/1241* (2013.01); *G06F 3/1261* (2013.01); *G06F 3/1291* (2013.01); *H04N 2201/0094* (2013.01)

(58) Field of Classification Search
CPC .......... G06F 3/12; G06F 3/126; G06F 3/1285; G06F 15/00; G06F 3/1204; G06F 3/1232; G06F 3/1261; G06F 3/1241; G06F 3/1291; G06K 15/02; H04N 1/32539; H04N 2201/0094
USPC ...................................................... 358/1.15
See application file for complete search history.

(56) References Cited

U.S. PATENT DOCUMENTS

| | | | |
|---|---|---|---|
| 6,157,465 A | 12/2000 | Suda et al. | |
| 7,688,464 B2 | 3/2010 | Lodolo | |
| 7,804,611 B2 | 9/2010 | Castellani | |
| 7,852,497 B2 * | 12/2010 | Sato | G06F 3/1205 358/1.1 |
| 8,559,033 B2 | 10/2013 | Kohli et al. | |
| 8,947,698 B2 | 2/2015 | Isidore | |
| 9,092,178 B2 | 7/2015 | Aritomi | |
| 9,606,758 B1 * | 3/2017 | Chandler | G06F 3/1206 |
| 2004/0042033 A1 | 3/2004 | Sesek et al. | |
| 2004/0179230 A1 | 9/2004 | Kitada et al. | |
| 2007/0067626 A1 | 3/2007 | Briancon | |
| 2007/0076254 A1 * | 4/2007 | Reilly | G06F 3/1206 358/1.15 |
| 2009/0165012 A1 | 6/2009 | Corona | |
| 2011/0242565 A1 * | 10/2011 | Armstrong | G06F 3/121 358/1.13 |
| 2012/0044531 A1 | 2/2012 | Sakai | |
| 2013/0070296 A1 | 3/2013 | Ishibashi | |

(Continued)

OTHER PUBLICATIONS

Anonymous. How to load balance printers. http://www.printmanager.com/management/files/How%20to%20load%20balance%20print.

(Continued)

*Primary Examiner* — Allen H Nguyen
(74) *Attorney, Agent, or Firm* — HP Inc. Patent Department

(57) ABSTRACT

Examples disclosed herein relate to receiving, at a first printing device, a request to print a print job, determining, by the first printing device, whether the print job has been received by the first printing device, in response to determining that the print job has not been received by the first printing device, determining whether a second printing device has received the print job, and, in response to determining that the second printing device has received the print job, retrieving the print job from the second printing device and printing the print job at the first printing device.

7 Claims, 4 Drawing Sheets

(56) References Cited

U.S. PATENT DOCUMENTS

| | | |
|---|---|---|
| 2013/0120780 A1 | 5/2013 | Hamada |
| 2013/0141746 A1 | 6/2013 | Miller et al. |
| 2013/0169989 A1 | 7/2013 | Oki |
| 2013/0321861 A1* | 12/2013 | Ishihara ................ G06F 3/1224 358/1.15 |
| 2015/0002892 A1 | 1/2015 | Maeda |
| 2015/0350461 A1 | 12/2015 | Kim |
| 2016/0011834 A1* | 1/2016 | Hama ................... G06F 3/1208 358/1.15 |
| 2016/0219184 A1 | 7/2016 | Ohmiya |
| 2016/0291904 A1* | 10/2016 | Fukushima ........... G06F 3/1285 |

OTHER PUBLICATIONS

Hewlett-Packard Development Company, "Easily enable secure mobile printing: HP mobile printing solutions for business", Jul. 2015, 8 pages.

Barribeau et al., U.S. Appl. No. 15/047,549 entitled Peripheral Device Job Direction filed Feb. 18, 2016 (24 pages).

\* cited by examiner

PRINT JOB ACCESS PROVISION

BACKGROUND

In some situations, a user may desire to send jobs to peripheral devices, such as sending a document to a printer to be printed. Oftentimes, the user may have multiple peripheral devices from which to select. These peripheral devices may offer different features and properties for processing the jobs directed to them.

BRIEF DESCRIPTION OF THE DRAWINGS

In the accompanying drawings, like numerals refer to like components or blocks. The following detailed description references the drawings, wherein.

DETAILED DESCRIPTION

Figure 1:
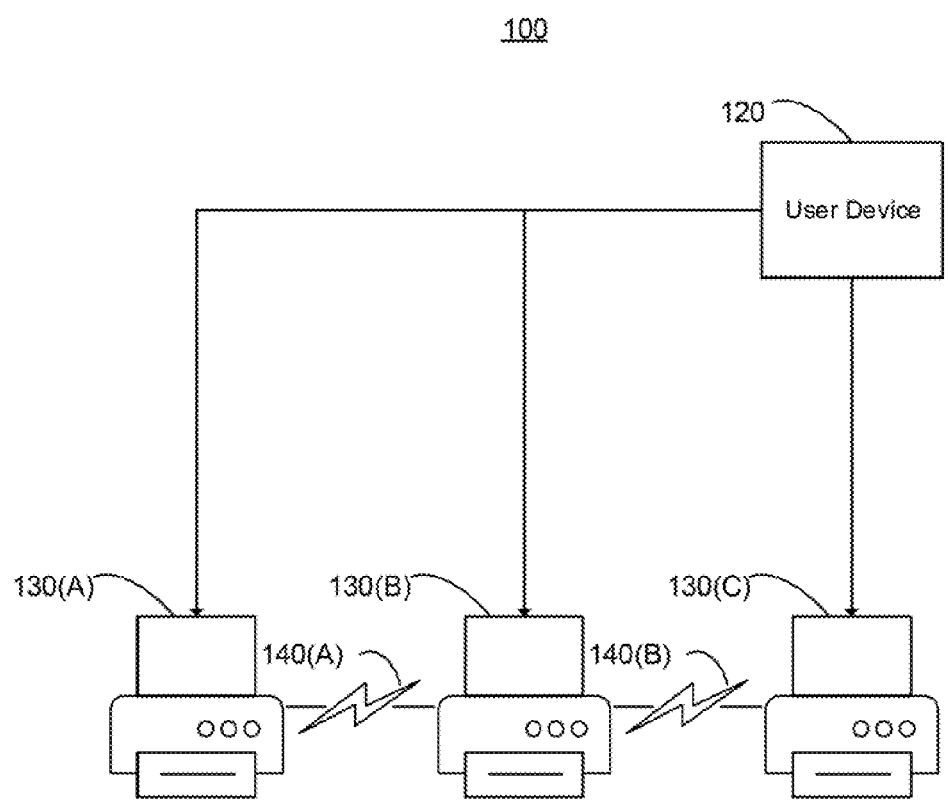
FIG. 1 is a block diagram of an example print job access provision environment.

In some situations, multiple peripheral devices, such as printers, copiers, scanners, faxes, multi-function devices, etc., may be available in an environment, such as an office in which numerous copiers, scanners, printers, multi-function devices, etc. are installed. Such peripheral devices may enable the automatic establishment of a network amongst devices existing within relatively close geographic proximity, such as within the same organization, company, office building, etc. A mesh and/or peer-to-peer network may be established by the printers automatically and without the need for complex network infrastructure or print servers. A plurality of existing communication protocols/technologies could be leveraged to facilitate this functionality, such as WiFi, cellular, and Bluetooth protocols for wireless communication and/or TCP/IP communications over wired connections.

Each device of the mesh network may be made aware of the status and abilities of neighboring or nearby devices. These devices may then choose to collaborate with said printers to deliver an improved experience to its users. For example, in the event of an unexpected error, one printer could forward its current print queue and/or remaining unprinted pages to another suitable printer. For another example, one printer may automatically split, and/or suggest splitting, a large print job between two (or more) neighboring printers, so that the overall print time will be halved. In another example, an incorrectly selected printer may notify its user of an alternate nearby printer more suited to printing their particular content (e.g., a selected monochrome printer may redirect a color print job to a color-capable printer). The user need not have been aware of the existence/location of the more suitable printer due to the exchange of information amongst the devices of the mesh network. For another example, a flatbed scanner may detect that a user is attempting to scan a large number of pages, such as by repeated opening and closing of the flatbed lid, and may prompt the user via a control panel display to use a nearby scanning device with a page feeder tray.

Pull printing is being used more and more frequently in situations where multiple printing devices are available. In pull printing, a user may retrieve a waiting print job on a given printing device, such as by entering access credentials, selecting the job from a list, entering a PIN, etc.

In many situations, however, pull printing requires heavy infrastructure investments. Pull printing requires IT departments to invest in and set up a dedicated print server for storing and distributing print jobs. This limits pull printing to enterprise-class deployments. Thus, smaller businesses that aren't going to invest in such an infrastructure aren't able to make use of Pull Printing. In other situations, a shared print server, such as a cloud server, may be used to store a print job, but such a server increases network latency times and may present an unwarranted security risk.

In some implementations, controllers of each printing device and/or other computing devices, such as PCs, may talk to each other to form an ad hoc peer-to-peer connection, forming a self-contained printer mesh network. Such a network may reside, for example, on a company intranet or a physical location (such as a library, business center, campus, office building, etc.). Minimal IT expertise is required, as the printers may be pre-configured to automatically discover each other and form the mesh network. In some implementations, an administrator or printing device owner may first enable a peer-to-peer feature.

In such implementations, users need to be just be able to print to any one printer on the network. They can do so using their PC, phone, or tablet. The print job may now be stored on the printer controller's onboard memory, and may be available to retrieve from any other printer on the mesh network using the user's credential. Such credentials may comprise, for example, a PIN, username/password, NFC and/or RFID badge, or NFC/BLE-enabled phone. For such uses, users no longer have to install specific printers or worry about which printer to send their print job to. The user can simply print to any device seen from their PC and walk up to any printing device on the mesh network to retrieve their job.

By imparting a degree of spatial awareness to printers existing in a multi-printer deployment environment (e.g. enterprise, education, business center, etc.), solutions to overcome errors may be provided to users. By communicating with a multitude of devices, each device's relative location may be deduced by using its inbuilt wireless communications radio(s) (e.g., triangulation via multiple WiFi signals).

For example, a WiFi positioning system may be used to determine a relative spacing, direction, and/or location for each of the devices. In some implementations, a technique used for WiFi positioning with wireless access points may be based on measuring the intensity of the received signal (received signal strength indication or RSSI) and the method of fingerprinting, or recording of the signal strength from several access points in range and storing this information in a database along with the known coordinates of the device. Typical parameters useful to geolocate the Wi-Fi device include the SSID and the MAC address of the device. The accuracy depends on the number of positions that have been entered into the database. The Wi-Fi device database may be filled by correlating mobile device GPS location data with Wi-Fi device MAC addresses.

The devices may exchange, and thus be aware of, nearby devices capabilities and statuses, thus allowing the devices to make actionable recommendations to the user and/or automatically effect the recovery or continuation of a job should a device issue or error arise. Recommendations may be delivered to users via the device's control panel, an application, such as a mobile app or web page, and/or a driver interface. The device may be capable of forwarding the necessary job data to the selected neighboring device.

Some implementations described herein require minimal IT expertise required to set up mesh network as printing devices may discover each other and connect automatically when a peer-to-peer networking feature is enabled. A user who can print to any one printer on the network can retrieve their job from any other printer on the network. If the printer that received the print job is jammed or out of ink, the user can just walk over to the next one and retrieve the print job for printing there. Some implementations may support other features such as automatically rerouting print jobs to devices with the right capabilities, such as accessible printers with stapling, duplexing, etc, automatically splitting big jobs between machines for faster completion, and/or automatically rerouting a print job when a selected printing device is busy.

Referring now to the drawings, FIG. 1 is a block diagram of an example print job access provision environment 100. Environment 100 may comprise a user device 120, a plurality of printing devices 130(A)-(C), and a plurality of networking connections 140(A)-(B). User device 120 may comprise, for example, a laptop, desktop computer, mobile device, smartphone, tablet, server computer, multifunction device, etc. Connections 140(A)-(B) may comprise any communication medium and/or protocol to allow the exchange of data among peripheral devices 130(A)-(B) such as wired networking, wireless networking (WiFi), cellular, Bluetooth, etc.

In some implementations, user device 120 may provide a print job for a selected one of printing devices 130(A)-(C). The print job may be stored on a memory of the selected printing device, e.g. device 130(A). The user may then choose to print the print job at another of the printing devices, such as device 130(B), by entering a request to retrieve the print job on a control panel of device 130(B). The print job may be associated with a user identifier and/or job identifier via the request. Device 130(B) may then query other connected printing devices (e.g., device 130(A) and device 130(C)) to determine whether one of those devices has the print job stored. Upon determining that the job is stored on device 130(A), the print job may be provided via network connection 140(A) from device 130(A) to device 130(B) for printing on device 130(B).

Figure 2:
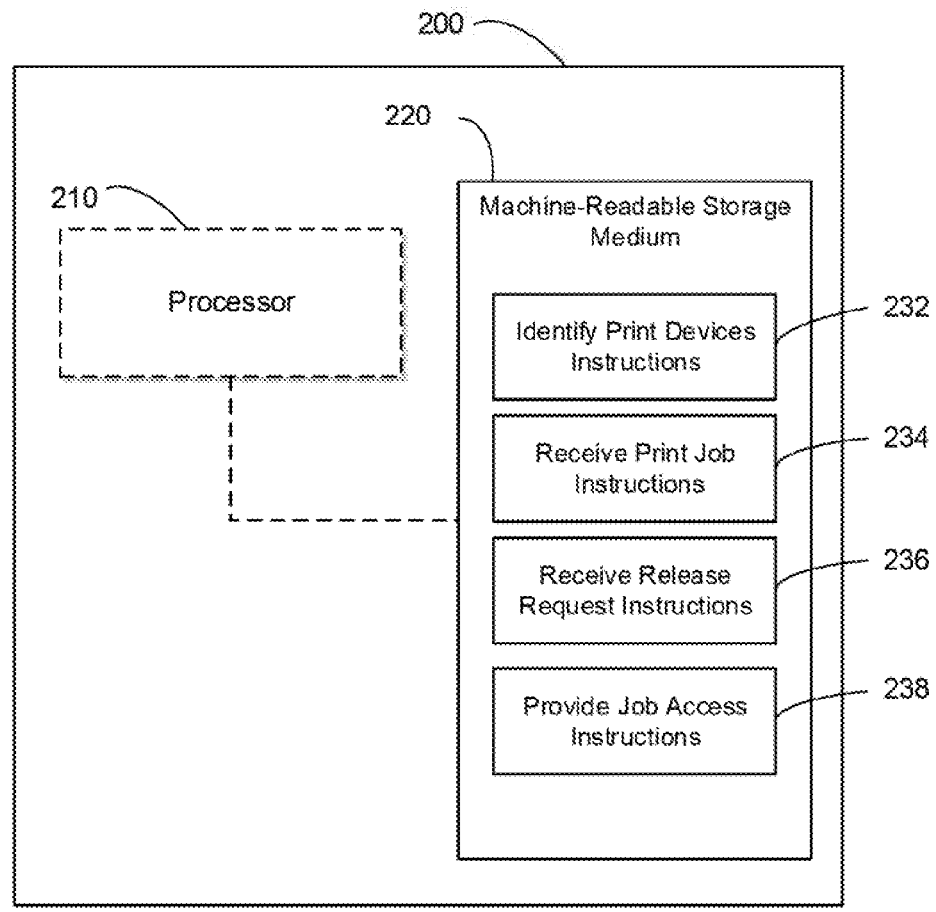
FIG. 2 is a block diagram of an example print job access provision device.

FIG. 2 is a block diagram of an example print job access provision device 200 consistent with disclosed implementations. Print job access provision device 200 may comprise a processor 210 and a non-transitory machine-readable storage medium 220. Print job access provision device 200 may comprise a computing device such as a server computer, a desktop computer, a laptop computer, a handheld computing device, a smart phone, a tablet computing device, a mobile phone, a network device (e.g., a switch and/or router), a peripheral device, a printing device, or the like.

Processor 210 may comprise a central processing unit (CPU), a semiconductor-based microprocessor, a programmable component such as a complex programmable logic device (CPLD) and/or field-programmable gate array (FPGA), or any other hardware device suitable for retrieval and execution of instructions stored in machine-readable storage medium 220. In particular, processor 210 may fetch, decode, and execute a plurality of identify print devices instructions 232, receive print job instructions 234, receive release request instructions 236, and provide job access instructions 238 to implement the functionality described in detail below.

Executable instructions may comprise logic stored in any portion and/or component of machine-readable storage medium 220 and executable by processor 210. The machine-readable storage medium 220 may comprise both volatile and/or nonvolatile memory and data storage components. Volatile components are those that do not retain data values upon loss of power. Nonvolatile components are those that retain data upon a loss of power.

The machine-readable storage medium 220 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, and/or a combination of any two and/or more of these memory components. In addition, the RAM may comprise, for example, static random access memory (SRAM), dynamic random access memory (DRAM), and/or magnetic random access memory (MRAM) and other such devices. The ROM may comprise, for example, a programmable read-only memory (PROM), an erasable programmable read-only memory (EPROM), an electrically erasable programmable read-only memory (EEPROM), and/or other like memory device.

Identify print devices instructions 232 may identify a plurality of available printing devices. For example, Identify print devices instructions 232 poll at least one communication network for available printing devices. A broadcast message may be sent out over one and/or more communications media, such as WiFi, wired, Cellular, Bluetooth, NFC, etc. requesting that printing devices respond. The broadcast message may take various formats according to the type of communication medium. Bluetooth devices, for example, may be configured to broadcast their availability on a periodic basis and/or in response to a broadcast pairing request.

In some implementations, identify print device instructions 232 may limit the identification of available devices to devices sharing a geographic location. Such locations may, for example, be determined via WiFi triangulation and/or Bluetooth signal strength, to direct the job to a more convenient device. For example, the job may be redirected to a similar device that is closer to the user, but which the user may have been unaware of and/or to remedy an incorrectly selected device, such as a device on a different floor or office. Further, a user's geolocation may be captured by the mesh network and utilized externally for other purposes, such as locating a user's current approximate position within an office building as part of a mobile wayfinding application to aid the user in finding the device to which the job has been directed.

The instructions to poll at least one communication network for available printing devices may further comprise instructions to authenticate each of the available printing devices. For example, each available device may need to be configured with an authentication key and/or be joined to a particular network domain. Non-recognized and/or non-authenticated devices may be excluded from being considered available. In some implementations, devices may include non-printing devices such as tablets, PCs, servers, etc. For example, a network storage device may be used to store print jobs until a print request is received at one of the printing devices. Such a network storage device may respond to the poll of devices on the mesh network and provide access to the print job.

Receive print job instructions 234 may receive a print job at a first printing device of the plurality of available printing devices. For example, a user may submit a document to be printed via a "Print" command in an application on their computer and/or in an app on their mobile device. In some implementations, no driver need be pre-installed. For example, the app may be configured to pair with one and/or more of the printing devices via Bluetooth and retrieve the list of available devices. A user may then select any of these devices as a destination for their print job without installing additional software.

Receive release request instructions 236 may receive, at the first printing device, a request to release the job to a second printing device of the plurality of available printing devices. For example, a user may enter a personal identification number (PIN) associated with themselves and/or the print job. Similarly, a user may log in to the printing device, such as with a username and password, an authentication badge (e.g., an NFC, RFID, etc. enabled card or device), and/or other authentication method (e.g., biometric).

Provide job access instructions 238 may provide access to the print job to the second printing device from the first printing device. For example, the user may input the release request at device 130(B) after sending the print job originally to device 130(A). Device 130(B) may query a plurality of available printing devices 130(A)-(C) for the print job, such as by providing a user and/or print job identifier to each of the plurality of available printing devices 130(A)-(C) as a broadcast and/or by individually polling the plurality of printing devices 130(A)-(C). Once the print job has been located on one of the print device 130(A)-(C), the print job may be transmitted over an available communication medium (e.g., wired or WiFi network, Bluetooth, cellular, infrared, etc.) to the device that received the release request. The receiving device may then print the print job.

Provide job access instructions 238 may further comprise instructions to cause the second printing device and the first printing device to each print a portion of the print job. In some implementations, receive print job instructions 234 and/or provide job access instructions 238 may further comprise instructions to determine whether the print job is over a threshold size. For example, a print job over 50 pages may be split into two (or more) jobs, with each job being printed simultaneously at different printing devices. In such a use case, for example, a user may send the print job to device 130(A), which may detect that the print job is over a configurable threshold size. The user may retrieve the print job at device 130(B), which may retrieve the print job from device 130(A). The two devices may then split the print job in half such that device 130(B) prints the first half and device 130(A) prints the second half. In some implementations, a notification of this determination may be displayed to the user on a control panel of device 130(B) with the recommendation to utilize both devices. Such a recommendation may comprise a list of other available devices (e.g., devices 130(A) and 130(C)) and receive a selection of one and/or more of the other available devices with which the printing can be divided.

Provide job access instructions 238 may further comprise instructions to determine whether the second printing device is unable to print the print job. In response to determining that the second printing device is unable to print the print job, provide job access instructions 238 may further comprise instructions to provide access to the print job to a third printing device of the plurality of available printing devices. For example, the device that received the user's request to release the print job may be jammed or may lack a capability to complete the job (e.g., does not have the right size paper, lacks a stapler, duplexes, binder, and/or other finishing capability, does not print in color, etc.). The list of available devices may be used to identify a printing device with the needed capabilities and the print job may be routed to that device and a notification may be displayed to the user. The print job may be transmitted from the printing device that originally received the print job and/or from the printing device that received the user's request to release the print job.

Figure 3:
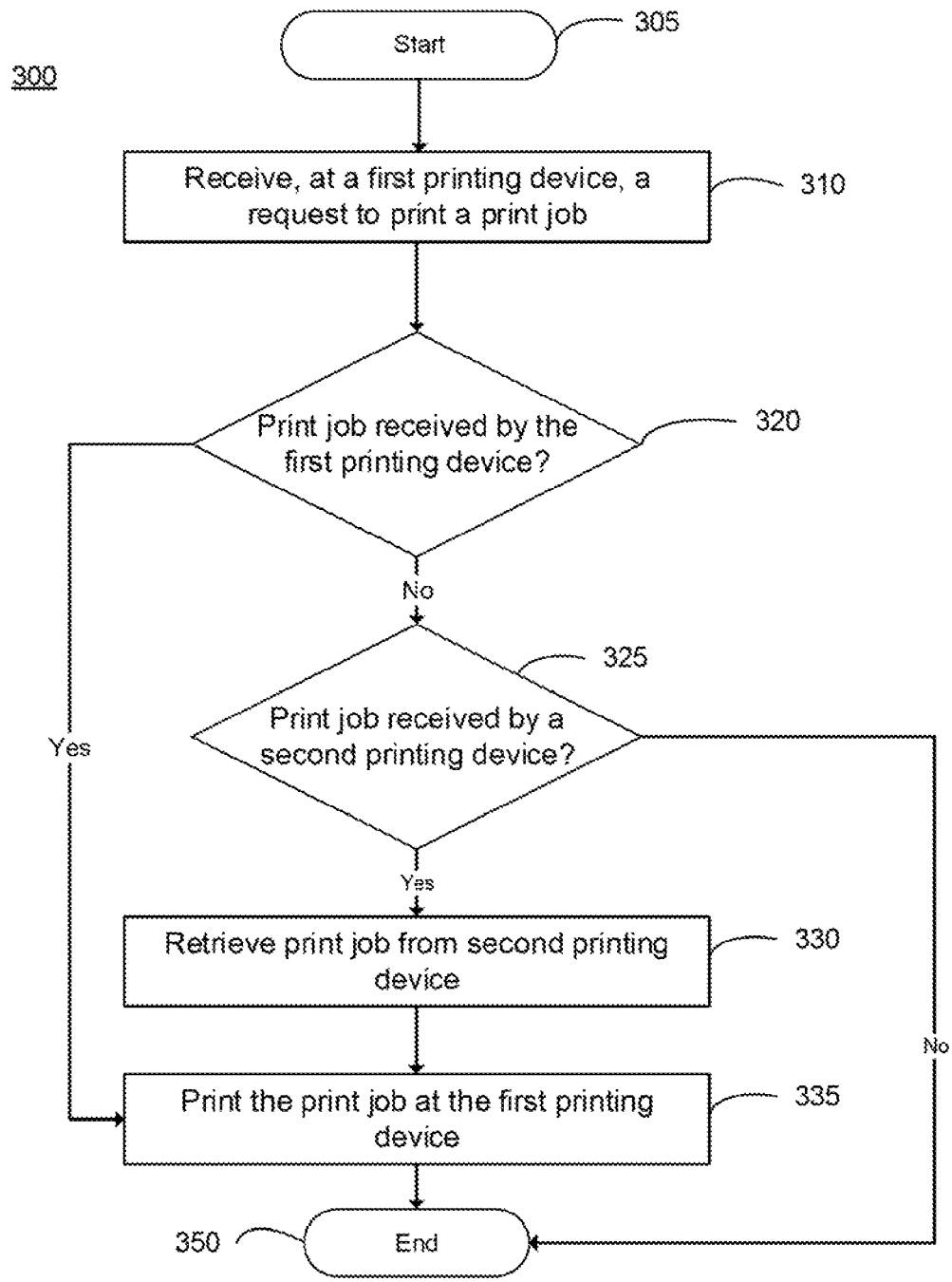
FIG. 3 is a flowchart of an example of a method for providing print job access provision.

FIG. 3 is a flowchart of an example method 300 for providing print job access provision consistent with disclosed implementations. Although execution of method 400 is described below with reference to device 200, other suitable components for execution of method 300 may be used.

Method 300 may begin in stage 305 and proceed to stage 310 where device 200 may receive, at a first printing device, a request to print a print job. For example, receive release request instructions 236 may receive, such as via a printing device control panel, a request to print a job. The print request may be used to formulate a request to release the job and may comprise information such as a job and/or user identifier.

Method 300 may then advance to stage 320 where device 200 may determine, by the first printing device, whether the print job has been received by the first printing device. The print job may be received when a user submits the print job from a desktop computer application and/or a mobile app. For example, receive print job instructions 234 may receive the print job at a first printing device (e.g., device 130(A)) of a plurality of available printing devices. In some implementations, no driver need be pre-installed. For example, the app may be configured to pair with one and/or more of the printing devices via Bluetooth and retrieve the list of available devices. A user may then select any of these devices as a destination for their print job without installing additional software.

In some implementations, the first printing device may comprise a recommended alternative to the second printing device. For example, the print job may have been submitted originally to the second printing device, but the second printing device may be out of paper, jammed, or busy. A recommendation may be provided to the user, such as via a print driver, an application, mobile app, and/or on a display panel of the first and/or second printing device to print the job at the first printing device instead of the second printing device.

In response to determining that the print job has not been received by the first printing device, method 300 may advance to stage 325 where device 200 may determine whether a second printing device has received the print job. For example, the first printing device may query a plurality of available printing devices for the print job, such as by providing a user and/or print job identifier to each of the plurality of available printing devices and/or by polling the plurality of printing devices coupled to a network.

In response to determining that the second printing device has received the print job, method 300 may advance to stage 330 where device 200 may retrieve the print job from the second printing device. A request to release the print job may be made from one printing device to another, such as where the user submitted the print job to one device, but made the request to print the job at another device. For example, a user may enter a personal identification number (PIN) associated with themselves and/or the print job. Similarly, a user may log in to the printing device, such as with a username and password, an authentication badge (e.g., an NFC, RFID, etc. enabled card or device), and/or other authentication method (e.g., biometric). The user may specify a particular print job and/or select from a list of waiting print jobs at one and/or more of the printing devices.

In some implementations, provide job access instructions 238 may provide access to the print job to one printing device from another printing device. For example, the user may input the release request at device 130(B) after sending the print job originally to device 130(A). Device 130(B) may query a plurality of available printing devices 130(A)-(C) for the print job, such as by providing a user and/or print job identifier to each of the plurality of available printing devices 130(A)-(C) as a broadcast and/or by individually polling the plurality of printing devices 130(A)-(C). Once the print job has been located on one of the print device 130(A)-(C), the print job may be transmitted over an available communication medium (e.g., wired or WiFi network, Bluetooth, cellular, infrared, etc.) to the device that received the release request.

After retrieving the print job at stage 330, or if the print job was determined to have been received by the first printing device at stage 320, method 300 may advance to stage 335 where device 200 may print the print job at the first printing device. For example, the printer may translate information from a received file associated with the print job into an appropriate printer control language (PCL). The PCL translation may be used to control the imprint, such as of ink, toner and/or 3D polymer or other material onto an appropriate medium, such as paper of a size specified by the print job. After printing the job at stage 335 or if the print job could not be retrieved at stage 325, method 300 may end at stage 350.

Figure 4:
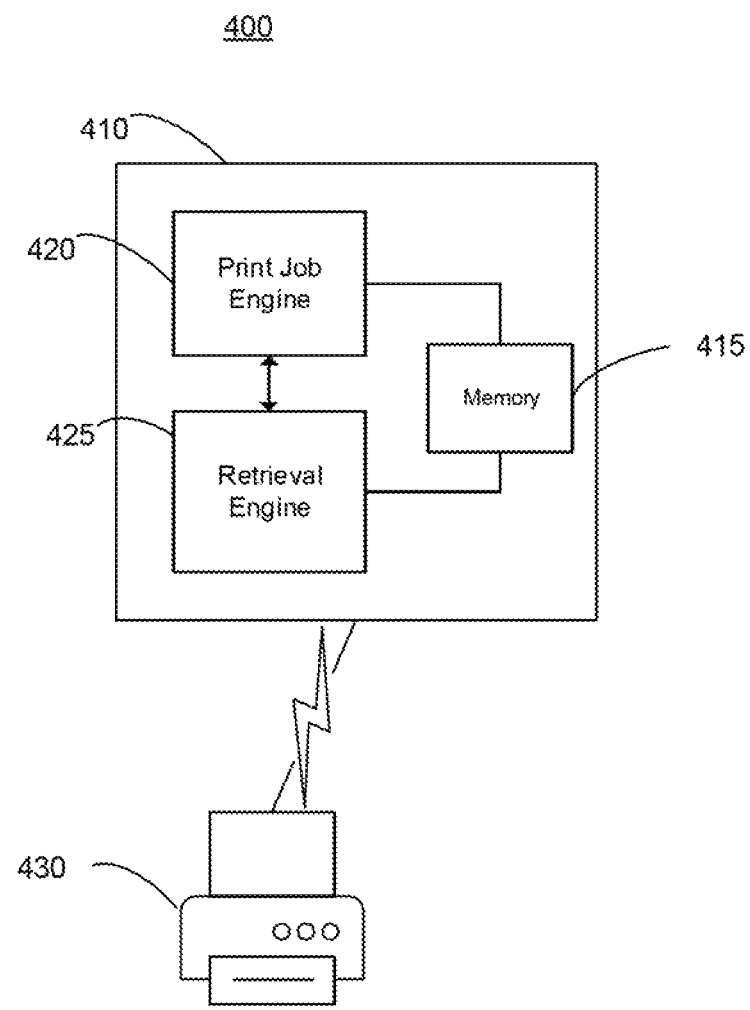
FIG. 4 is a block diagram of an example system for providing print job access provisions.

FIG. 4 is a block diagram of an example system 400 for providing print job access provision. System 400 may comprise a computing device 410 comprising a memory 415, a print job engine 420 and a retrieval engine 425. Engines 420 and 425 may be associated with a single computing device 410 and/or may be communicatively coupled among different devices such as via a direct connection, bus, or network. Each of engines 420, 425 may comprise hardware and/or software associated with computing devices. System 400 may further comprise a communicatively coupled printing device 430 and/or other printing devices (not shown), similar to printing devices 130(A)-(C). In some implementations, computing device 410 may also comprise a communicatively coupled printing device.

Print job engine 420 may receive a print job, wherein the print job is associated with a user identifier and store the print job in the memory. For example, receive print job instructions 234 may receive a print job at a first printing device of the plurality of available printing devices (e.g., device 430). For example, a user may submit a document to be printed via a "Print" command in an application on their computer and/or in an app on their mobile device. In some implementations, no driver need be pre-installed. For example, the app may be configured to pair with one and/or more of the printing devices via Bluetooth and retrieve the list of available devices. A user may then select any of these devices as a destination for their print job without installing additional software.

Retrieval engine 425 may receive a request to release the print job to a second printing apparatus, wherein the request comprises the user identifier and an authorization, and upon validation of the authorization, provide the print job to the second printing apparatus. For example, receive release request instructions 236 may receive, at device 410, a request to release the job to device 410 for printing. For example, a user may enter a personal identification number (PIN) associated with themselves and/or the print job on a control panel of device 410. Similarly, a user may log in to the printing device, such as with a username and password, an authentication badge (e.g., an NFC, RFID, etc. enabled card or device), and/or other authentication method (e.g., biometric).

Printing device 430 may provide the print job to retrieval engine 425. For example, provide job access instructions 238 may provide access to the print job to the second printing device from the first printing device. For example, the user may input the release request at device 410 after sending the print job originally to device 430. Device 410 may query a plurality of available printing devices 130(A)-(C), 430 for the print job, such as by providing a user and/or print job identifier to each of the plurality of available printing devices 130(A)-(C), 430 as a broadcast and/or by individually polling the plurality of printing devices 130(A)-(C), 430. Once the print job has been located on one of the print device 130(A)-(C), 430, the print job may be transmitted over an available communication medium (e.g., wired or WiFi network, Bluetooth, cellular, infrared, etc.) to the device that received the release request (e.g., device 410). The receiving device may then print the print job.

The disclosed examples may include systems, devices, computer-readable storage media, and methods for print job access provision. For purposes of explanation, certain examples are described with reference to the components illustrated in the Figures. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Moreover, as used in the specification and the appended claims, the singular forms "a," "an," and "the" are intended to include the plural forms as well, unless the context indicates otherwise. Additionally, although the terms first, second, etc. may be used herein to describe various elements, these elements should not be limited by these terms. Instead, these terms are only used to distinguish one element from another.

Further, the sequence of operations described in connection with the Figures are examples and are not intended to be limiting. Additional or fewer operations or combinations of operations may be used or may vary without departing from the scope of the disclosed examples. Thus, the present disclosure merely sets forth possible examples of implementations, and many variations and modifications may be made to the described examples. All such modifications and variations are intended to be included within the scope of this disclosure and protected by the following claims.

I claim:

1. A computer-implemented method, comprising:
   receiving, at a first printing device, a request to print a print job;
   determining, by the first printing device, whether the print job has been received by the first printing device;
   in response to determining that the print job has not been received by the first printing device, determining whether a second printing device has received the print job; and
   in response to determining that the second printing device has received the print job:

retrieving the print job from the second printing device, and printing the print job at the first printing device.

2. The computer-implemented method of claim 1, wherein determining whether the second printing device has received the print job comprises querying a plurality of available printing devices for the print job.

3. The computer-implemented method of claim 2, wherein querying the plurality of available printing devices for the print job comprises providing a user identifier to each of the plurality of available printing devices.

4. The computer-implemented method of claim 2, wherein querying the plurality of available printing devices for the print job comprises providing a print job identifier to each of the plurality of available printing devices.

5. The computer-implemented method of claim 2, wherein querying the plurality of available printing devices comprises polling the plurality of printing devices coupled to a network.

6. The computer-implemented method of claim 5, wherein the network comprises at least one of the following: a wired network, a wireless network, an ad-hoc network, a Bluetooth connection, and a cellular network.

7. The computer-implemented method of claim 1, wherein the first printing device comprises a recommended alternative to the second printing device.

\* \* \* \* \*